May 15, 1962 S. A. CRAVOTTA 3,034,943
SLIP-RESISTANT TREAD AND METHOD OF MANUFACTURE THEREOF
Filed March 22, 1960

INVENTOR.
SAMUEL A. CRAVOTTA
BY
*Karl Huber*
ATTORNEY
*John G. Kovaleic*
AGENT

United States Patent Office 3,034,943
Patented May 15, 1962

3,034,943
SLIP-RESISTANT TREAD AND METHOD
OF MANUFACTURE THEREOF
Samuel A. Cravotta, 6141 N. 11th Road, Arlington, Va.
Filed Mar. 22, 1960, Ser. No. 16,703
6 Claims. (Cl. 154—52)

The present invention deals with a slip-resistant tread and a method of manufacture thereof and more particularly with a slip-resistant tread for floors, decks, ladders, stairs and the like.

This application is a continuation-in-part of copending application Serial No. 790,754, filed February 2, 1959.

Slip-resistant treads as heretofore known usually comprise a base layer of rubber, metal, fiber products, etc., having abrasive hard granular material in the form of abrasive powder or chips bonded to the surface of the base by adhesive or cement, and the granular material or chip presenting a non-slipping surface.

A disadvantage of such slip resistant treads is that substantial wear results in the dislocation of the abrasive particles at certain areas leaving at least portions of the tread without slip resistant effect. This condition is especially undesirable under conditions where oils and greases are present in that even small areas bare of slip resistant particles are sufficient to promote slippage.

It is an object of the present invention to provide a slip-resistant tread which maintains slip resistance regardless of the degree of wear. It is another object of the invention to provide a slip resistant tread of various forms and which maintains substantially uniform slip resistance throughout the surface thereof regardless of the degree of wear. It is a further object of the invention to provide a method for the manufacture of a slip resistant tread capable of maintaining substantially uniform slip resistance throughout its useful life. It is a still further object of the invention to provide a slip-resistant tread composed of laminated resin-impregnated fabrics, the resin containing a luminescent pigment. Other objects and advantages of the invention will become apparent from the description hereinafter following and the drawings forming a part thereof, in which:

The invention deals with a slip resistant tread comprising a composite cemented multi-layer body of laminated resin-impregnated fabric having abrasive substance on a surface thereof and completely embedded therein, whereby slip resistance is maintained regardless of the degree of wear of the tread, and the resin containing a luminescent pigment. The multiple layer structure, in addition to providing for longer wear, contributes added rigidity and strength to the tread in comparison with single layer type treads.

Figure 1:
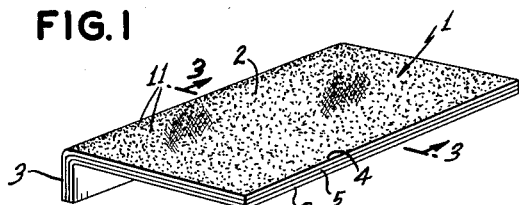
FIGURE 1 illustrates an isometric view of a slip resistant tread according to the invention.
Figure 2:
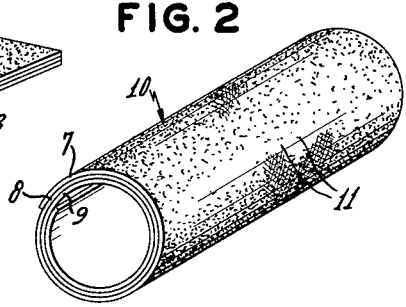
FIGURE 2 illustrates an isometric view of a modification of the invention.
Figure 5:
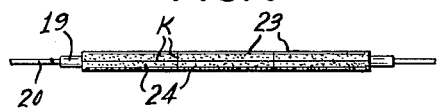
FIGURE 5 illustrates a top plan view of a method of forming individual treads.

The tread of the invention may be provided in various forms, e.g. a flat panel, a tube, or a substantially flat panel having a portion thereof curved outwardly of the flat surface. FIGURES 1 and 2 illustrate the latter two forms including the flat panel with a portion thereof curved so as to cover the flat portion of a ladder or stair and the leading edge thereof as well, and FIGURE 2 illustrates the tread in the form of a tube.

FIGURE 1 particularly illustrates a tread 1 having a flat area 2 and a portion 8 extending outwardly therefrom. Both forms are provided as multi-layer treads comprising composite layers 4, 5 and 6 as shown by FIGURE 1 and concentric tubular layers 7, 8 and 9 as shown by FIGURE 2 in the form of a tube 10.

Figure 3:
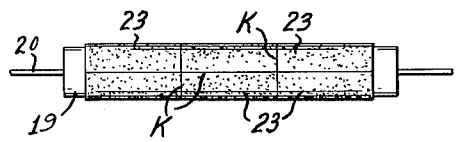
FIGURE 3 illustrates a cross-sectional view along lines 3—3 of FIGURE 1.
Figure 6:
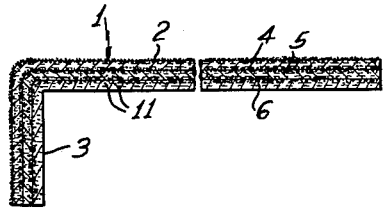
FIGURE 6 is a side plan view of FIGURE 5.

FIGURE 3 illustrates an enlarged cross-sectional view along lines 3—3 of FIGURE 1 particularly showing the layers 4, 5 and 6. These layers are each composed of fabric layers, either woven or unwoven, or otherwise layers of chopped fibers or random fibers, and impregnated with a resin such as a polyester resin, styrenated resin, or the like fire resistant resin, such, for example, as manufactured by the Hooker Chemical Company, N.Y., under the name of Hetron 92. The impregnating resin contains a luminescent pigment of the fluorescent or phosphorescent type. The pigment may be one of a variety of pigments in the form of a fluorescent powder pigment or phosphorescent powder pigment such as sold under the trade name Helecon of the United States Radium Corp., Morris Plains, New Jersey, with the fluorescent crystalline powder being capable of excitation by ultraviolet light and the phosphorescent crystalline powder being excitable by either sunlight or incandescent lamps. The luminescent pigments are more particularly identified as Helecon 2200, Helecon 2301, and Helecon 2315 containing zinc sulfide or zinc-cadmium sulfide together wtih a copper compound or silver-copper compound as an activation agent. Other types of pigments contemplated are identified as Helecon 2478, Helecon 2479 and Helecon 2480 containing calcium-strontium sulfide together with bismuth as an activation agent. The composite material of the invention comprises essentially abrasive particles 11, e.g. particles of aluminum oxide, silicon carbide, corundum, emery, and the like abrasive particles or granules, bonded to a surface of the composite material and also embedded within the composite material between the fabric layers 4, 5 and 8. While the abrasive particles are embedded within the material, they are embedded as separate layers, separated by the layers of fabric material.

The composite tread is prepared by applying, for example, a liquid polyester resin, admixed with a luminescent pigment, to a fabric material whereby the fabric is impregnated by the resin, and thereafter abrasive particles are applied such as by sprinkling over the entire surface of the resin-impregnated fabric, and a second layer of resin-impregnated fabric is laid over the particle sprinkled surface of the first layer, the second layer being sprinkled with abrasive particles and a third layer of resin-impregnated fabric is positioned over the sprinkled surface of the second layer and a fourth layer of abrasive particles sprinkled onto the top surface of the preceding resin-impregnated fabric layer. It is apparent that as many layers as desired may be utilized depending upon the desired thickness of the composite material. Having combined and sprinkled the various layers as described above, the composite material is permitted to cure in the shape of a flat panel or into any other desired form. When various shapes of treads are desired, an appropriate mold conforming to such shape may be employed wherein the composite material is cured and solidified.

Figure 4:
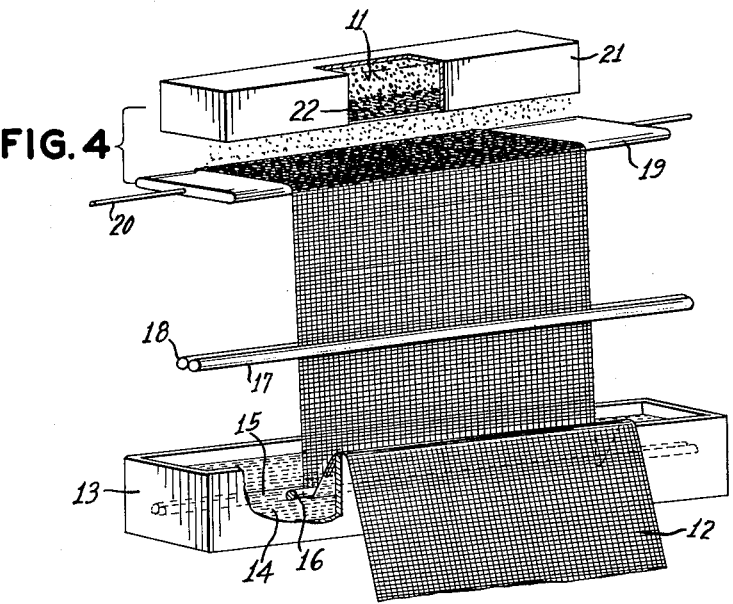
FIGURE 4 illustrates an isometric view of an appartus employed in the manufacture of the treads.

FIGURE 4 illustrates a particular method of preparing the composite laminated tread according to the invention. According to FIGURE 4, a sheet of fabric, for example, woven fiberglass 12 is passed into a tank 13 containing a liquid polystyrene resin 14, containing from about 5 percent to 20 percent by volume, e.g. 10 percent, of a Helecon pigment. The resin may otherwise contain distributed therethrough a mixture of such pigments in an amount sufficient to provide adequate luminescence. The fabric 12 is passed through the liquid resin between guide rolls 15 and 16, or merely over a single guide roll. The fabric 12 is impregnated by the liquid resin 14 and passed between rolls 17 and 18, where excess resin is removed and then passed over a rectangular mandrel 19, which is rotated on axis 20 to build up a plurality of layers thereon. As the mandrel 20 is rotated, the particles 11, contained in container 21 are passed through a screen 22, which is vibrated, and thereby the particles 11 are deposited on the resin-impregnated fabric. After two or more rotations of the mandrel, whereby the individual layers of impregnated fabric are provided with a layer of abrasive particles, the material is cut as at X, and the mandrel 19 is removed. The laminated fabric is then cured and after curing the solidified laminated layers are cut into sections 23 and 24 defining shaped treads as illustrated by FIGURE 1. The treads are removed from the mandrel and have the form illustrated by FIGURE 1. In the case of tubular treads illustrated by FIGURE 2, the mandrel is cylindrical and preferably made of molded plaster and the tubes are removed therefrom by breaking the plaster away from the tube.

While the description refers to particular forms of treads, various modifications are contemplated within the scope of the appended claims.

What is claimed is:

1. A slip-resistant tread comprising a lamination of resin-impregnated fabric layers, the resin containing a luminescent pigment, a layer of abrasive particles between the fabric layers, and a layer of abrasive particles bonded on the surface of the tread by the impregnating resin and providing a slip-resistant surface.

2. A slip resistant tread according to claim 1, wherein the pigment is selected from the group consisting of fluorescent and phosphorescent pigments.

3. A slip-resistant tread according to claim 1, wherein the pigment is a pigment selected from the group consisting of activated zinc sulfide, zinc-cadmium sulfide and calcium-strontium sulfide.

4. A slip-resistant tread according to claim 1, wherein the tread is in the form of a flat panel.

5. A slip resistant tread according to claim 4, wherein the tread is in the form of a panel having a longitudinal end portion extending outwardly thereof.

6. A slip-resistant tread according to claim 1, comprising a lamination of concentric tubes.

References Cited in the file of this patent

UNITED STATES PATENTS

| | | |
|---|---|---|
| 1,814,532 | Sutherland | July 14, 1931 |
| 2,275,989 | Perry | Mar. 10, 1942 |
| 2,284,716 | Benner et al. | June 2, 1942 |
| 2,814,329 | Sitton | Nov. 26, 1957 |
| 2,871,152 | Tobin | Jan. 27, 1959 |

FOREIGN PATENTS

| | | |
|---|---|---|
| 261,818 | Great Britain | Nov. 29, 1926 |
| 553,561 | Great Britain | May 27, 1943 |